Patented Apr. 3, 1945

2,372,985

UNITED STATES PATENT OFFICE 2,372,985

COMPOSITIONS FOR TREATMENT OF FIBROUS MATERIALS

Murray H. Roth, Brooklyn, N. Y., assignor to The Richards Chemical Works, Jersey City, N. J., a corporation of New Jersey No Drawing. Application March 28, 1942, Serial No. 436,713

8 Claims. (Cl. 252—8.8)

The present invention relates to novel and useful compositions of matter; and, more particularly, to such compositions which are useful in the treatment of fibrous materials such as leather, hides, skins, furs and various textile materials, including wool, cotton, rayon and other fabrics.

Over a period of many years, efforts have been made in this art to produce or discover products useful for the treatment of fibrous materials such as those named above, and particularly to impart specific properties to the treated material, as by improving the texture, "hand," "feel," "richness" and other properties or qualities recognized in the trade. In recent years there have been a number of developments in the art having to do with the use of "cation-active" materials for various textile-treating purposes, and a number of such cation-active materials have gone into considerable industrial use.

I have discovered, and it is that discovery which forms the subject-matter of the instant application for patent, a novel class of compositions or materials which are especially useful for such textile treatment; and, specifically, which are of value and have utility in the treatment of leather and other hides and skins, as well as fabrics. These novel compositions impart to the treated material, I have found, new, useful and, especially, different properties, when employed for such treatment; and, in general, such properties or qualities are different from those which are imparted by the use of known "cation-active" materials such as those which have recently come into commercial use. For example, my novel compositions may be used to increase the richness or "feel" of suede leather, without imparting "greasiness" thereto; they do not discolor or oxidize when used on white leather; they are compatible with various stable metals and their salts, such as the salts of aluminum, calcium, magnesium and chromium; and they possess certain other advantages such as stability to acids, imparting easy "wettability" to chrome leather and increasing the fastness of acid and direct-type dyestuffs. Certain of my novel materials also have special utility as softening agents for wool and other textile fabrics, as hereafter illustrated.

In general, the novel and useful compositions which I have discovered are (so far as I am at present aware) in the nature of mixtures or "complexes" (but whether physical or chemical compounds I have not determined), resulting from the treatment of, or action upon, a "cation-active" substance with a phosphatide.

Such novel mixtures or complexes are preferably employed in solution or in the form of an emulsion; and, being in general soluble or dispersible in water, the aqueous solutions or emulsions are ordinarily employed. Upon addition of water to the complex, it may dissolve or form an emulsion, and upon further addition of water, the viscosity decreases. Ordinarily, water is added gradually to the composition, with agitation if desired, and the material is used as thus diluted. Warm water will dissolve or disperse the materials more quickly.

By a "cation-active material," as that expression is used herein, I mean, in general, a basic organic nitrogen compound possessing a straight or branched, saturated or unsaturated, carbon chain of at least 8 carbon atoms, or a hydroaromatic ring of at least 8 carbon atoms, the basic nitrogen atom occurring either in a straight chain as a primary, secondary or tertiary nitrogen atom, or in a heterocyclic ring of 5 to 7 atoms as an imino group or tertiary nitrogen atom.

These cation-active materials are preferably used in the form of their salts, ordinarily their water-soluble salts, such as the chloride, bromide, acetate, formate, lactate or glycolate; or by treatment with alkylating agents to form quaternary salts such as sulfomethylate and sulfoethylate.

It is to be understood, also, that the above-mentioned basic nitrogen compounds may be used in the free basic, partially neutralized, or completely neutralized state. Further, the carbon chain may be interrupted by other atoms or atom groups, such as O, S, N, CO, CONH.

By a "phosphatide," as that expression is used herein, I mean, in general, that type of compound which is found widely in animal and vegetable tissues, and which consists of, or comprises, the esters of glycerol and phosphoric acid combined with fatty acids and alkamines.

If the alkamine is choline, the phosphatide is a "lecithin."

The formula of an illustrative lecithin (namely, one of the constituents of egg-yolk) is:

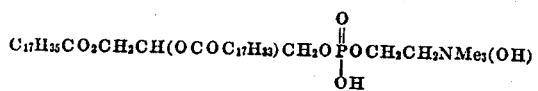

Hydrolysis of the foregoing material gives stearic, oleic and phosphoric acids, glycerol and choline.

Many other fatty acids are also found in various lecithins. Other possible modifications depend on the attachment of the phosphoric acid to glycerol in the beta position and on optical isomerism. The cephalins contain aminoethyl alcohol in place of choline.

Phosphatides of the foregoing character may be either those which occur naturally, or are derived from natural products, or materials which are produced synthetically.

As examples of "cation-active materials" which may be employed in the preparation of my novel compositions, whether mixtures or complexes, the following may be mentioned: primary, secondary and tertiary amines, amino-oxides, imidazoles, imidazolines, oxazoles, pyrimidines, imidoethers, substituted pyridines, substituted ammonias, substituted ureas, substituted thioureas, substituted guanidines, substituted betaines.

Illustrative examples of such compounds which may be used are the following substances or their salts—laurylamine, stearylamine, oleylamine, coconut fatty acid amines, abietyl amine, monostearyl ethylene diamine, N-stearyl paraphenylene-diamine, stearamidine, mono stearyl urea, beta stearyl amino pyridine, cetyl pyridinium bromide, diethylamino ethylstearate, mono oleyl-N-hydroxyethyl ethylene diamine, stearimidazoline, N-dodecyl-pyrimidine, stearimidoethyl ether, N-stearoyl hydroxyethyl-acetbenzimidazole, N-lauryl-N' diethyl amino ethyl urea.

As illustrative examples of "phosphatides" which may be used for the treatment of such "cation-active" substances, in order to produce the novel compositions, whether mixtures or complexes, according to my invention, there may be mentioned more particularly those products naturally occurring in vegetable oils such as lecithins and cephalins. As examples, there may be given the phosphatides extracted from soya bean oil, coconut oil, corn oil and cotton seed oil, as well as from egg yolk and other phosphatide-rich materials.

It is to be understood, also, that commercial phosphatides contain varying amounts of free oil; and these phosphatide-oil mixtures may be employed, either with or without addition of pure phosphatide. Other glyceride oils and waxes such as neat's-foot oil, olive oil, corn oil, sperm oil, soya bean oil, castor oil, Japan wax, beeswax, spermaceti, as well as mineral oils and paraffin wax, may also be used with the phosphatides, to give a range of products having modified properties.

Certain modifying or auxiliary agents, which appear to have a "coupling" or dispersing action upon phosphatides, oils, and cation-active materials may also be employed to enhance the stability, solubility or dispersion of the above-mentioned compositions, or otherwise improve or modify their action. Such auxiliary products are exemplified by high molecular weight alcohols, polyglycols, ethers and their esters and ethers. As illustrative examples of such materials may be given: octyl alcohol, ethylene glycol, diethylene glycol, nonaethylene glycol, glycerine, ethyl ether of diethylene glycol, lauric acid ester of ethylene glycol monobutyl ether, diethyl carbitol. High molecular weight polyether alcohols formed by the condensation of fatty acids or fatty alcohols with ethylene-oxide may also be used. Also, reaction products of fatty acid amines, fatty acid amides, fatty alcohol sulfates, with ethylene oxide may be used.

Commercial products which may be used for this purpose are the Emulphors (a trade-marked product of General Dyestuffs Corporation, New York city), Triton NE (a trade-marked product of Rohm and Haas Co., Philadelphia), the Carbowaxes (a trade-marked product of Carbide & Carbon Chemicals Corporation, New York city), condensation products of glycols, glycerol, carbitol, mannitol, pentaerythritol with fatty acids. Specially, modifying or auxiliary agents of this character include: "Emulphor" EL (General Dyestuffs Corporation), "Emulphor" O (General Dyestuffs Corporation), "Triton" NE (Rohm and Haas Co.), "Carbowax" 1500 and 4000 (Carbide & Carbon Chemicals Corporation) as well as glyceryl mono ricinoleate and modified mannitan monolaurate—the latter manufactured by Atlas Powder Company of Wilmington, Delaware.

So far as at present advised, the foregoing commercial products are identified by the following chemical names or structural formulae: the Emulphors—substituted fatty polyether alcohols of type formula $R(C_2H_4O)_xC_2H_4OH$ where R is a fatty chain either saturated or unsaturated containing 8 to 22 carbon atoms, and $x$ is 4 to 15; the Tritons—substantially similar products; the Carbowaxes 1500 and 4000—polyethylene glycol, type formula $(C_2H_4O)_xC_2H_4OH$ where $x$ is 35 to 90; modified mannitan monolaurate—the type formula is:

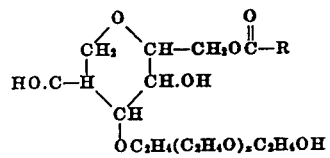

where R is an alkyl chain which in the case of lauryl is $C_{12}H_{25}$—and $x$ may be 3 to 12. According to my present understanding, the approximate composition of "Emulphor" EL is substantially oleyl dodeca ethylene glycol ether having the formula:

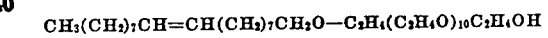

So far as at present advised, preferred compositions according to my invention may contain from approximately 0.10 part to approximately 10 parts by weight of "cation-active" substance for each part of "phosphatide." They may be prepared by mixing, and preferably heating together, a cation-active material and a phosphatide; or in some cases an emulsion or solution may be prepared by adding a phosphatide to a solution of a cation-active material, preferably with heating.

For many compositions, no auxiliary or modifying substance is necessary, especially in the case of compositions containing more than about one part of cation-active material for each part of phosphatide; but for other compositions, from about 0.5% to about 15% of an auxiliary or modifying material, such as those illustrated above, may be used to advantage in order to obtain a desired improved or modified effect, such as a finer particle size of the resulting emulsion, a more stable emulsion, greater penetration into the leather or fabric, increased stability to acids and salts, or the like. Such compositions may also be enriched by the addition of oils and waxes, added either to the undiluted compositions, or by emulsification in aqueous solutions of such compositions.

The following specific examples are given as illustrative of compositions, whether mixtures or complexes, resulting from the treatment of a cation-active material with a phosphatide material, to produce a composition according to my invention; and also as illustrative of certain uses of my novel compositions.

Example 1

A product according to my invention is prepared by heating together for about one hour, at approximately 50° C., equal parts of N-stearyl hydroxyethyl-ethylene diamine acetate and commercial soya bean phosphatide. Chrome leather, which has been washed, is treated in a revolving drum with approximately 2% (calculated on the "pickle" weight of the skins) of the product stated, which is dissolved in enough warm water fully to immerse the leather. Such treatment is continued by drumming the leather for approximately an hour. The skins so treated, on drying, posesss a soft "handle" and are easily wet back for dyeing.

Example 2

Vegetable tanned leather is treated for about two hours in a drum or paddle, with about 4% (calculated on the "pickle" weight of the skins) of the product described in Example 1, using enough warm water to immerse the skins. After about two hours the skins are rinsed with water and hung up to dry. Leather so treated is soft and pliable and possesses a unique and desirable surface "feel."

Example 3

Alum tanned leather is treated with about 2% (calculated on the "pickle" weight of the skins) of a product made by heating together for about an hour at a temperature of about 50° C., 50 parts lauryl imidazoline acetate, 40 parts corn oil phosphatide, and 10 parts Emulphor EL (sold by General Dyestuffs Corporation of New York city). The product is dissolved in enough warm water to float the skins, and in this solution the skins are drummed for about one hour, allowed to drain and hung on hooks. After drying, the skins are soft, pliable and easily staked. Such leather is free from any sticky feeling and is suitable for gloves and garments.

Example 4

Formaldehyde tanned leather is treated with about 10% aluminum sulfate and about 1% (calculated on the "pickle" weight of the skins) of a product made by heating together for one hour at 45–50° C., 60 parts of stearyl imidazoline acetate and 40 parts of corn oil phosphatide. The aluminum sulfate and the composition made as above are dissolved in enough 3% salt solution fully to immerse the skins. After drumming for about one hour, the pH is gradually raised to 5.2 by addition of borax over a period of one-half hour, and the treatment is continued for an additional one-half hour. The skins, on drying and staking, are very white, possess good "temper," and are suitable for white shoe and strap leather.

Example 5

Chrome tanned sheepskins are treated with about 8% (calculated on the "pickle" weight of the skins) of a product made by mixing and heating together, at a temperature of 50° C. for one hour, 30 parts cetyl pyridinium bromide, 30 parts cottonseed oil phosphatide and 20 parts neat's-foot oil. The product is dissolved in warm water at a temperature about 45–50° C., to give an emulsion in which the skins are drummed. After one hour's treatment the skins are rinsed, hung up to dry and may be used to make either grain or sueded glove leather.

Example 6

Split chrome-tanned cowhides which have been dyed and buffed are treated with about 1% (calculated on the "pickle" weight of the skins) of a product made by heating together for one hour at 50° C. in a jacketed kettle provided with good agitation, 50 parts N-stearyl ethylene diamine lactate, 10 parts soybean lecithin, 20 parts neat's-foot oil, and 10 parts glyceryl mono laurate. After drumming in the usual way for one hour the skins are toggled and dried and may be finished with either a lacquer or the usual casein pigment finish.

Example 7

Deerskins which have been formaldehyde-and-alum tanned, and while still in a wet or damp condition, are treated with about 3% (calculated on the "pickle" weight of the skins) of a composition made by mixing together in a jacketed kettle for about one hour at a temperature of approximately 50° C., 12 parts lauryl imidazoline acetate, 20 parts corn oil phosphatide, 5 parts coconut oil, 5 parts white mineral oil, 5 parts neat's-foot oil, 10 parts Emulphor EL (sold by General Dyestuffs Corporation of New York city) and 43 parts of water. After treating in the usual way for one hour, the skins are hung up and allowed to dry. After drying, the skins are staked, split and buffed, yielding a strong white leather suitable for shoes.

Example 8

Chrome tanned goatskins which have been colored and fat-liquored with a sulfated-oil fat liquor, are spread on a table while still in a damp condition. A concentrated emulsion is made by dissolving approximately 10 parts of the product described in Example 7 in 90 parts of warm water at a temperature of about 40–45° C., and this emulsion is swabbed or brushed on the grain surface of the leather. After drying, the leather is plushed on the grain side, giving a lustrous, soft and brilliantly-colored grain.

Example 9

A dyed wool fabric is treated with about 0.25% by weight of the product described in Example 1, in a dyeing machine or other suitable equipment such as a padder, for thoroughly immersing the fabric. After one-half hour the fabric is squeezed and dried in the usual way. Wool fabrics so treated have enhanced luster, soft feel, and improved draping qualities.

Example 10

A printed cotton fabric is treated in a quetsch with a solution containing approximately 1% of the product of Example 3, and then squeezed so that the fabric picks up an equal weight of solution. After drying the fabric possesses an agreeable soft feel and good draping qualities.

Example 11

Rayon fabric, after dyeing, is rinsed and treated in a dye beck with about 0.5% of the product described in Example 7, then centrifuged and dried. A soft rich handle and desirable draping qualities are obtained.

From the foregoing examples, it will be seen that a considerable range of products compounded according to my invention may suitably be employed for treatment of various kinds of skins and fabrics. Among the compositions which I have found to be particularly adapted to these purposes, as illustrated by the foregoing examples, are the following:

1. A composition comprising a mixture of about 50 parts of N-stearyl hydroxyethyl-ethylenediamine acetate and about 50 parts of soya bean phosphatide. Considerable variation in these proportions is permissible. The composition may be prepared by heating the two materials together for about an hour at approximately 50° C.

2. A composition which comprises a mixture of about 50 parts lauryl imidazoline acetate, about 40 parts of corn oil phosphatide, and about 10 parts of Emulphor EL (a trade-marked product of General Dyestuffs Corporation, New York city). This composition may be prepared by heating the ingredients together for about an hour at a temperature of approximately 50° C. Considerable variation in the proportions named is permissible.

3. A composition comprising a mixture of about 12 parts of lauryl imidazoline acetate, about 20 parts of corn oil phosphatide, about 5 parts of mineral oil, about 5 parts of neat's-foot oil, about 10 parts of Emulphor EL and about 43 parts of water. This composition may be prepared by mixing the ingredients together in a jacketed kettle for about one hour, at a temperature of approximately 50° C. Considerable variation in the proportions of the named ingredients is permissible.

The term "consisting essentially of" certain thereafter named ingredients in the appended claims is intended to be construed to exclude the presence of any major or substantial amounts of any ingredients other than those specifically named in the claims. It does not, however, exclude the presence of minor amounts of additive materials, most if not all of which would be inert from the point of view of the contemplated use of applicant's novel material.

The examples given above, and illustrative applications and uses of the novel compositions according to my invention, include the best embodiments thereof now known to me; but it is to be understood that the invention is not necessarily or specifically limited thereto, and may, under proper conditions, have other embodiments without departing from the spirit of the invention, and within the scope of the following claims.

I claim:

1. A new and useful composition of matter, which consists essentially of from about 10% to 90% of a cation-active material and from about 90% to 10% of a phosphatide.

2. A new and useful composition of matter, which consists essentially of an organic complex produced by mixing from about 10% to 90% of a cation-active material with from about 90% to 10% of a phosphatide, and heating the mixture at about 50° C. for about one hour.

3. The novel and useful composition of matter which consists essentially of a mixture of about 50 parts N-stearyl hydroxyethyl-ethylenediamine acetate and about 50 parts soya bean phosphatide.

4. The novel and useful composition of matter which comprises a mixture of about 50 parts lauryl imidazoline acetate, about 40 parts of corn oil phosphatide and about 10 parts modifying agent comprising substantially oleyl dodeca ethylene glycol ether.

5. The novel and useful composition of matter which comprises a mixture of about 12 parts lauryl imidazoline acetate, about 20 parts of corn oil phosphatide, about 5 parts of mineral oil, about 5 parts of neat's-foot oil, about 10 parts of modifying agent comprising substantially oleyl dodeca ethylene glycol ether and about 43 parts of water.

6. As a new and useful composition of matter, an aqueous colloidal solution of a mixture consisting essentially of from about 10% to 90% of a cation-active material with about 90% to 10% of a phosphatide.

7. A new and useful composition of matter, consisting essentially of a product produced by treating about 10% to 90% of a cation-active material with about 90% to 10% of a phosphatide by heating these materials together at about 50° C. for about one hour, and water.

8. A new and useful composition of matter, consisting essentially of a material formed from about 10 to 90 parts of a cation-active material and about 90 to 10 parts of a phosphatide, and an organic agent for reducing the particle size of the colloidal particles of the dispersed phase of an emulsion and hence enhancing the stability of the composition when dispersed in water.

MURRAY H. ROTH.